Patented Jan. 27, 1948

2,435,182

UNITED STATES PATENT OFFICE 2,435,182

METALLIZABLE AZO DYES CONTAINING A PYRAZOLONE RADICAL

Robert Sidney Long and Charles Edward Lewis, Somerville, N. J., assignors to American Cyanamid Company, New York, N. Y., a corporation of Maine No Drawing. Application December 8, 1944, Serial No. 567,306

8 Claims. (Cl. 260—162)

This invention relates to azo dyestuffs capable of being metallized derived from 3-amino-5-pyrazolones as coupling components. The dyestuffs may be represented by the following formula:

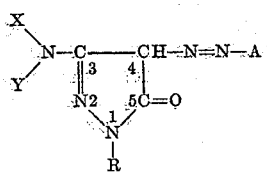

in which A is the residue of a diazotized aromatic primary amine having a lake-forming group ortho to the azo group, R is a radical selected from the group consisting of hydrogen and aryl radicals of the benzene and naphthalene series and in which X and Y are selected from the group consisting of hydrogen, acyl, alkyl and aryl radicals. Throughout the specification and claims the term "acyl" will be used in its more limited sense to define the radical of a carboxylic acid. The term will have no other meaning.

The products of the present invention are prepared in general by coupling onto the alkali soluble enols of the pyrazolones with diazotized aromatic amines which contain lake forming groups in the ortho-position to the diazo group. It is also convenient to prepare the dyestuffs containing acylamino groups in the 3-position of the pyrazolone nucleus by reacting first the aminopyrazolone with an excess of acylating agent and using the resulting pyrazole derivative as the coupling component, since the acyl group attached to the oxygen atom is split off by the action of alkaline agents at ordinary temperatures.

The resulting dyestuffs are valuable per se for dyeing animal fibres. They are also useful in processes such as the metachrome process in which metallizing takes place in the dye bath, or in processes involving separate treatment with metal on the goods, such as for example, top or bottom chroming processes.

Since the products of the present invention contain lake forming groups ortho to the azo group in both components, they are capable of forming stable metal complexes with the common metallizing agents.

Some typical pyrazolones of the above type which are useful in preparing the products of the present invention are those in which X and Y are both hydrogen and R is as defined, for example, 1-phenyl-3-amino-5-pyrazolone, 1-(alpha-naphthyl)-3-amino-5-pyrazolone, 1-(4'-methoxyphenyl)-3-amino-5-pyrazolone, 1-(3'-methylphenyl)-3-amino-5-pyrazolone, 1-(4'-chlorophenyl)-3-amino-5-pyrazolone, 1-(4'-sulfophenyl)-3-amino-5-pyrazolone, 1-(3'-nitrophenyl)-3-amino-5-pyrazolone, 3-amino-5-pyrazolone; those in which X is hydrogen, Y is an acyl radical, and R is as defined, for example, 1-phenyl-3-acetylamino-5-pyrazolone, 1-phenyl-3-benzoylamino-5-pyrazolone; those in which X is H, Y is an aryl radical, and R is as defined, for example, 1-phenyl-3-(N-phenylamino)-5-pyrazolone.

The preferred products of the present invention are the azo dyestuffs derived from the pyrazolines in which R is an aromatic radicals of the benzene series, these being readily obtained through condensation of mono-substituted hydrazines with esters of cyanoacetic acid in the presence of alkaline condensing agents (see Weissberger and Porter; J. Am. Chem. Soc. 64, 2133 (1942).

The diazo components useful in preparing the products of the present invention are those that have in the ortho position to the diazo group a group that can be converted into a metal complex such as, particularly, the hydroxy group, the carboxylic acid group, and also the alkoxy group and halogen which, under specific conditions in the process of metallization, may be replaced by the complex-forming hydroxyl. Some typical examples of useful diazo components are 2-amino-4-nitrophenol, 2-amino-5-nitrophenol, 2-amino-4-chlorophenol, 3-amino-4-hydroxybenzenesulfonic acid, 2-methyl-4-amino-5-hydroxybenzenesulfonic acid, 2-nitro-4-amino-5-hydroxybenzenesulfonic acid, 2-chloro-4-amino-5-hydroxybenzenesulfonic acid, 2-hydroxy-3-amino-5-chlorbenzenesulfonic acid, 3-amino-4-hydroxy-5-nitrobenzenesulfonic acid, 2-hydroxy-3-amino-5-nitrobenzenesulfonic acid, 2-hydroxy-3-amino-5-sulfobenzoic acid, 2-amino-5-sulfobenzoic acid, anthranilic acid, 1-amino-2-hydroxynaphthalene-4-sulfonic acid, 1-amino-2-hydroxy-6-nitronaphthalene-4-sulfonic acid, 3,3'-dichlorobenzidine, o-dianisidine, 1-(4'-sulfophenyl)-3-methyl-4-amino-5-pyrazolone, and the like.

The diazo component may be also further substituted by azo groups and the aminopyrazolones may be used also as end components in polyazo dyes.

The invention is illustrated by the following examples, the parts being by weight.

Example 1

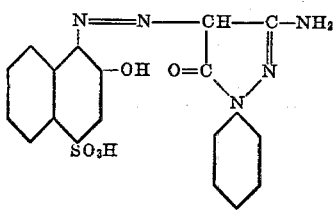

A solution of 1.8 parts of 1-phenyl-3-aminopyrazolone-5 in 20 parts of water and 3 parts of 20% sodium hydroxide is cooled to about 10° C. and to it is added slowly a solution of 2.8 parts of the diazo compound of 1-amino-2-hydroxy-4-naphthalene sulfonic acid (purity 89.2%) in 20 parts of water and 2 parts of 20% sodium hydroxide. The reaction mixture is stirred until coupling is complete and is then diluted with about an equal quantity of water. The azo dye is obtained as a bright red solid by acidification with mineral acid and filtration.

Example 2

A solution of 0.05 part of the azo dye obtained as in Example 1, 5 parts of a 10% solution of Glauber's salt, and 4 parts of a 10% solution of ammonium sulfate in 300 parts of water is prepared. 5 parts of wool flannel piece goods are scoured, rinsed, and added, and the whole is boiled for one-half hour, water being added as needed to maintain constant volume. There are then added 1.5 parts of a 10% solution of acetic acid and boiling is continued for one-half hour. In this manner the dyestuff dyes wool an attractive rust shade of good fastness to light and washing.

5 parts of previously scoured wool flannel are dyed in a similar manner and after boiling in the dye bath for one-half hour there are added 1.5 parts of a 10% solution of acetic acid and boiling is continued for one-half hour. The dyeing is top-chromed by adding 4 parts of a 1% solution of potassium dichromate and boiling for 40 minutes. The rust self-shade is thus converted to an attractive bordeaux tint of improved fastness properties.

The dyeing may also be after-treated with other metals by boiling in a bath containing a salt of the metal and a slight excess of acetic acid. In this manner the acid dyeing obtained above is converted to attractive bluish-red, reddish-orange, and orange shades with salts of copper, cobalt, and nickel, respectively.

Example 3

In order to apply the azo dyestuff of Example 1 to wool by the metachrome process, there is prepared a solution of the following composition:

| | Parts |
|---|---|
| The azo dye from Example 1 | 0.05 |
| A 10% solution of Glauber's salt | 5.00 |
| A 10% solution of ammonium sulfate | 4.00 |
| A 1% solution of potassium dichromate | 4.00 |
| Water | 300.00 |

To the solution is then added the wool material to be dyed and the whole is boiled for 40 minutes. There are then added 1.5 parts of a 10% solution of acetic acid and boiling is continued for one-half hour. The shade obtained in this manner is slightly bluer than the shade obtained in Example 2 using the top chrome procedure.

Example 4

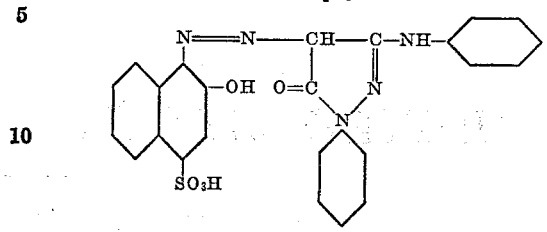

To a cooled solution of 1.8 parts of 1-phenyl-3-anilinopyrazolone-5 in 30 parts of water and 2 parts of 20% sodium hydroxide is added a solution of 2 parts of the diazo compound from 1-amino-2-hydroxy-4-naphthalenesulfonic acid (purity 89%) in 10 parts of water and 2 parts of 20% sodium hydroxide. A deep red solution is obtained and after stirring for a short time the coupling reaction is complete. Acidifying the reaction mixture with mineral acid produces a dark red, gelatinous product which is coagulated by diluting and heating. The dark red solid so obtained is then removed by filtration and dried at 60°.

When this product is applied on wool as an acid dyestuff by the procedure described in Example 2, there is obtained a level reddish-yellow shade which is converted to a blue tone bordeaux by the top chrome procedure described also in Example 2. The self-shade dyeing is also converted to a bordeaux tint by the metachrome procedure described in Example 3.

Example 5

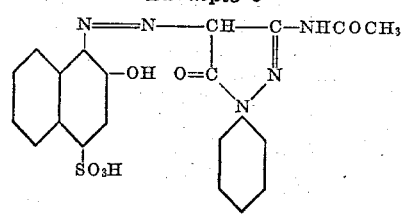

To a cooled solution prepared from 2.6 parts of 1-phenyl-3-acetylamino-5-acetoxypyrazole, 20 parts of water, and 4 parts of 20% sodium hydroxide is added a solution of 2.8 parts of the diazo compound from 1-amino-2-hydroxy-4-naphthalene-sulfonic acid (purity 89.2%) in 20 parts of water and 2 parts of 20% sodium hydroxide. The coupling reaction is complete after stirring for a short time at room temperature and the dyestuff is isolated as the sodium salt by the addition of sodium chloride. The product is removed by filtration.

When the azo dyestuff is applied as an acid color on wool by the procedure of Example 2, there is obtained an attractive reddish-yellow shade which is converted to a bordeaux by the topchrome procedure. A similar bordeaux shade is obtained by the metachrome procedure.

Example 6

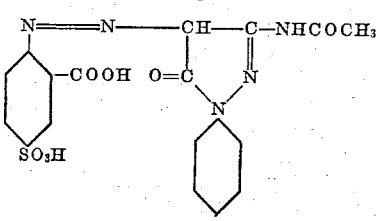

The diazo compound from 2-amino-5-sulfobenzoic acid is prepared in the usual manner from 2.8 parts of 2-amino-5-sulfobenzoic acid (purity 78.3%), 15 parts of water, 7 parts of 17% hydrochloric acid, and 9.9 parts of 7% sodium nitrite solution. The resulting solution of the diazo compound from 2-amino-5-sulfobenzoic acid is then added slowly with stirring to a cooled solution prepared from 2.6 parts of 1-phenyl-3-acetylamino-5-acetoxypyrazole, 10 parts of water, 4 parts of 20% sodium hydroxide, and 20 parts of 10% soda ash solution. After the addition of the diazo compound is complete the reaction mixture is diluted somewhat, neutralized with hydrochloric acid, and treated with salt to precipitate the yellow azo dye.

This new azo dye dyes wool as an acid dyestuff a yellow tint which is converted to a reddish yellow by the topchrome process. A similar reddish-yellow shade is obtained if the dyeing is made by the metachrome procedure.

*Example 7*

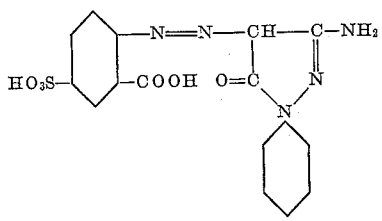

A solution of 5.9 parts of 2-amino-5-sulfobenzoic acid in 25 parts of water and 12 parts of 17% hydrochloric acid is diazotized in the usual manner with 20.2 parts of 7% sodium nitrite solution. The resulting solution is then added slowly to a cooled solution of 3.6 parts of 1-phenyl-3-aminopyrazolone in 20 parts of water, 8 parts of 20% sodium hydroxide, and 40 parts of 10% soda ash solution. The product separates as a thick, gelatinous, reddish-brown solid by acidification with mineral acid, but heating of this slurry to 90° C. results in coagulation to give the desired product in such a form that it is readily removed by filtration.

The new product dyes wool as an acid color a yellow shade. When the dyeing is made by the topchrome and metachrome procedures, reddish-yellow shades of improved fastness properties are obtained.

*Example 8*

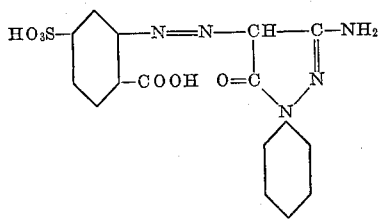

A solution of 2.8 parts of 2-amino-4-sulfobenzoic acid in 15 parts of water and 7 parts of 17% hydrochloric acid is diazotized in the usual manner with 11.5 parts of 7% sodium nitrite solution. The resulting solution is then added slowly with stirring to a cooled solution of 1.8 parts of 1-phenyl-3-aminopyrazolone in 10 parts of water, 4 parts of 20% sodium hydroxide, and 20 parts of 10% soda ash solution. After stirring for a short time, the reaction mixture is diluted and the desired product isolated as a reddish-tan solid by acidification with mineral acid and filtration.

When applied as an acid dye on wool, a yellow shade is obtained. The shade is considerably reddened when the dyeing is topchromed or when the dyestuff is applied by the metachrome procedure.

*Example 9*

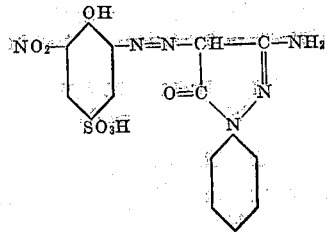

The diazo compound from 3-amino-4-hydroxy-5-nitro-benzenesulfonic acid is prepared in the usual manner from 1.8 parts of the amine. The resulting solution is then added slowly with stirring to a suspension of 1.2 parts of 1-phenyl-3-aminopyrazolone in 15 parts of 10% soda ash solution. As the reaction takes place, a clear solution results and it is necessary to add additional soda ash from time to time to maintain a weak alkalinity. After the coupling reaction is complete, the product is isolated as a red solid by acidification with mineral acid and filtration. An additional amount of the dyestuff may be obtained by heating the filtrate to 60° C., adding common salt, and cooling.

This product may be applied on wool as an acid color to give an attractive yellow shade. The shade is considerably redder when the dyestuff is applied by either the topchrome or metachrome procedure.

The metal complexes of the azo dyes of the present invention are not claimed per se in the present application, as they form the subject of our copending application Serial No. 567,305 filed Dec. 8, 1944.

In the claims the term "an amino group" is used generically to cover the group NH₂ and substituted amino groups, such as alkyl, aryl and acylamino groups.

We claim:

1. Azo dyes represented by the formula

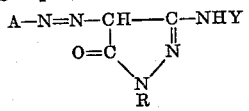

in which A is the radical of a diazotized amine selected from the group consisting of amines of the benzene and naphthalene series having in the ortho position to the amino substituent a metallizable substituent selected from in the group consisting of hydroxyl, alkoxyl, and carboxylic acid groups, R is an aryl group containing not more than two fused rings, and Y is selected from the group consisting of hydrogen, acyl, and phenyl.

2. Azo dyes according to claim 1 in which the aryl group on the 1-nitrogen is a radical of the benzene series.

3. Azo dyes according to claim 1 in which the diazotized amine is an amine of the benzene series.

4. Azo dyes according to claim 1 in which the aryl group on the 1-nitrogen is a radical of the benzene series and the diazotized amine is an amine of the benzene series.

5. Azo dyestuffs according to claim 1 in which Y is hydrogen.

6. Azo dyestuffs according to claim 1 in which Y is hydrogen and the aryl group on the 1-nitrogen atom is a radical of the benzene series.

7. Azo dyestuffs according to claim 1 in which

Y is hydrogen and the diazotized amine is an amine of the benzene series.

8. Azo dyestuffs according to claim 1 in which Y is hydrogen, the diazotized amine is an amine of the benzene series and the aryl group on the 1-nitrogen atom is a radical of the benzene series.

ROBERT SIDNEY LONG.
CHARLES EDWARD LEWIS.

REFERENCES CITED

The following references are of record in the file of this patent:

UNITED STATES PATENTS

| Number | Name | Date |
|---|---|---|
| 2,060,563 | Fischer | Nov. 10, 1936 |
| 2,133,864 | Kopp | Oct. 18, 1938 |
| 2,343,703 | Porter et al. | Mar. 7, 1944 |
| 2,311,082 | Porter et al. | Feb. 16, 1943 |
| 2,367,523 | Porter et al. | June 16, 1945 |

OTHER REFERENCES

Chem. Abst., vol. 16, page 2863 citing Norral. J. Am. Chem. Soc., vol. 44, pages 1551–7 (1922).